US005742285A

United States Patent [19]
Ueda

[11] Patent Number: 5,742,285
[45] Date of Patent: Apr. 21, 1998

[54] VIRTUAL SCREEN DISPLAY SYSTEM

[75] Inventor: Suguru Ueda, Kawasaki, Japan

[73] Assignee: Fujitsu Limited, Kanagawa, Japan

[21] Appl. No.: 839,385

[22] Filed: Apr. 18, 1997

Related U.S. Application Data

[63] Continuation of Ser. No. 610,246, Mar. 4, 1996, abandoned.

[30] Foreign Application Priority Data

Mar. 28, 1995 [JP] Japan .................................. 7-069006

[51] Int. Cl.⁶ ........................................................ G06F 15/00
[52] U.S. Cl. ............................ 345/342; 345/339; 345/340
[58] Field of Search .................................... 345/339, 340, 345/341, 342, 343, 344, 345

[56] References Cited

U.S. PATENT DOCUMENTS 5,463,726  10/1995  Price ........................................ 395/342
5,564,002  10/1996  Brown ...................................... 395/340

FOREIGN PATENT DOCUMENTS 63-228215  9/1988  Japan .

*Primary Examiner*—Raymond J. Bayerl
*Assistant Examiner*—Ba Huynh
*Attorney, Agent, or Firm*—Staas & Halsey

[57] ABSTRACT

A virtual screen processing section sets a virtual screen larger than is allowed by the display performance of the screen of a display section, displays a part of the virtual screen as a real screen on the display section, and controls the position of the real screen as needed in accordance with an operational input made by using the information input section. A window processing section arranges display screens based on the execution of individual applications as application windows on the virtual screen. A list display instructing section instructs the display of a list of application windows. A list display processing section collects window information including application information indicative of running applications and position information of the application windows of the running applications on the virtual screen, application by application, and displays a window information list based on the window information.

24 Claims, 7 Drawing Sheets

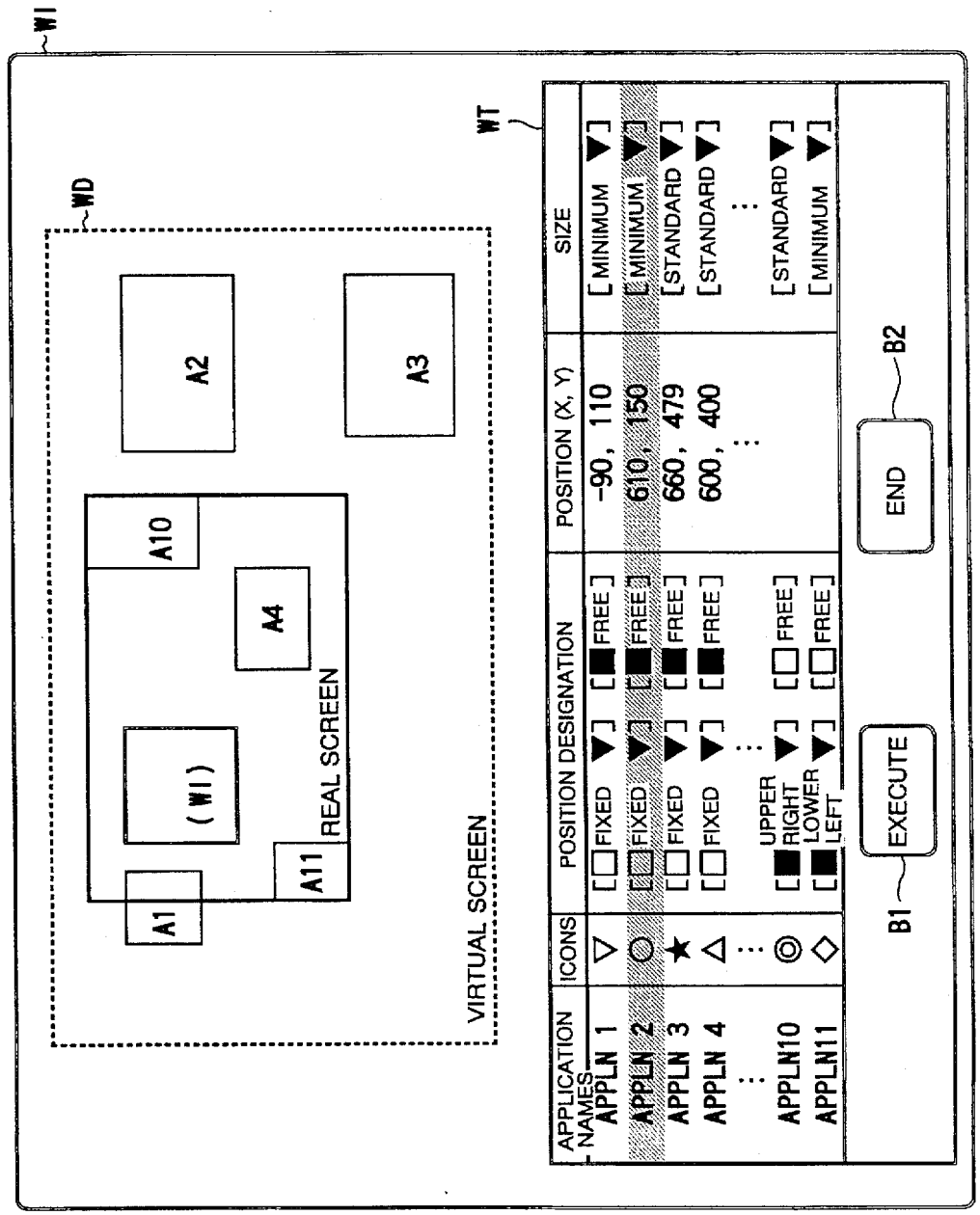

VIRTUAL SCREEN DISPLAY SYSTEM

This application is a continuation of application number 08/610,246, filed Mar. 4, 1996, now abandoned.

BACKGROUND OF THE INVENTION

1. Field of the Invention

The present invention relates to a multiwindow system which displays a plurality of windows associated with a plurality of applications on a common display screen. More particularly, this invention relates to a virtual screen display system which defines a virtual screen having a greater size than the real screen of the display, arranges a plurality of windows to be used by currently running multiple applications on that virtual screen, and allows an operator to shift the real screen that is actually displayed on the display, on the virtual screen.

2. Description of the Related Art

MS-Windows or Windows (Trademark of Microsoft Corp.) and X-Window in the UNIX system are known as multiwindow systems which actually or apparently accomplish simultaneous running of a plurality of applications and display windows associated with the individual applications on a common display screen.

Multiwindow systems like Windows and X-Window can allow an operator to freely alter the positions of windows individual applications use or application windows on the display screen by manipulating a pointing device like a mouse, or a keyboard.

The display screens of display devices have intrinsic limitations to their physical sizes or dot sizes (the numbers of the vertical and horizontal dots) based on the geometrical sizes and displayable resolutions. To concurrently display a plurality of application windows on the common display screen by such a multiwindow system, it is actually demanded to display a screen equivalent to one display screen for a system different from the multiwindow system on each associated application window. As multiwindow systems have been developed and improved, there arises a demand for displays which have large geometrical sizes and high resolutions, i.e., displays which have large physical sizes.

However, there is a productional limitation to the sizes of display devices, such as a CRT (Cathode Ray Tube) and LCD (Liquid Crystal Display) device, and there are also limitations to the sizes of displays that are actually placeable and the display sizes that operators can see without difficulty. The geometrical sizes of displays are therefore limited. Further, there are a principle limitation or a productional limitation to the resolutions of display devices such as a CRT and LCD device, and also a limitation to the resolution that operators can recognize. It is apparent that the resolutions of displays are limited.

To cope with the physical restriction to the screen size of a display 1, techniques which permit the use of a virtual screen SV wider than the actual display screen or the real display screen SR, as shown in FIG. 1, have been presented as application tools that run on a multiwindow system. A multiwindow display system which uses this virtual screen SV, larger in size than the real screen and accomplished by such an application tool, will be hereinafter called "virtual screen display system."

In this virtual screen display system, the virtual screen SV wider than the real screen SR is set and application windows W1 to W6, for example, created by a multiwindow system are arranged on this virtual screen SV, so that only a part of the virtual screen SV which is equivalent to what is inside the real screen SR is displayed on the actual screen of the display 1. Therefore, the application windows W2–W4 and a part of the application window W5 alone are displayed on the display 1, and the application windows W1 and W6 and the remaining part of the application window W5 are not displayed on the display 1. As an operator manipulates a pointing device like a mouse or performs a specific operation on a keyboard (which differs from the operation for changing the position of an application window), at least one of the position and size of the real screen SR on the virtual screen SV is altered.

According to the conventional virtual screen display systems of this type, when an operator wants to display, on the real screen SR, application windows, which come off the real screen SR that is displayed on the screen of the display 1 and become hidden from an operator, for example, the application windows W1 and W6 in FIG. 1, the operator should perform some operation to shift the position of the real screen SR on the virtual screen SV or the relative position of the virtual screen SV to the real screen SR. As the relative movement of the virtual screen SV to the real screen SR takes place, all the application windows W1–W6 on the virtual screen SV move together with the virtual screen SV in relative to the real screen SR.

In this case, however, before the operation of shifting the real screen SR or changing the size thereof, the application windows W1 and W6 which are out of the real screen SR are not displayed on the screen of the display 1 at all. As the operator is observing only the real screen SR, the operator is quite unaware of where on the virtual screen SV the application windows W1 and W6 are located, whether any application window is present on the virtual screen SV outside the real screen SR, or what kinds of applications are present outside the real screen SR. It is not therefore easy for the operator to perform the aforementioned operation to shift the real screen SR, and this operation itself is troublesome.

In this case, even if some application window is present outside the real screen SR, i.e., even if a currently running application whose application window is not currently displayed on the real screen SR is present, the operator, unknowing it, may deactivate the window system or the tool which is accomplishing the virtual screen display process to terminate the virtual screen display.

If the window system is terminated when some application window is present off the real screen SR, the associated application even if running is forcibly terminated so that unsaved and necessary data may be lost. If the tool which is accomplishing the virtual screen display process is deactivated to terminate the virtual screen display while some application window is still located outside the real screen SR, the window system may not be able to identify the coordinates of this application window, thus making it difficult to resume the execution of the associated application thereafter or change the position or size of the application window.

SUMMARY OF THE INVENTION

Accordingly, it is an object of the present invention to provide a virtual screen display system which allows an operator to easily recognize one or more application windows on a virtual screen regardless of whether or not such application windows are present on a real screen, thereby ensuring easy alteration of the position of the real screen on the virtual screen or the relative position of the virtual screen to the real screen.

A virtual screen display system according to this invention comprises:

an information input section for inputting information;

a display section for displaying images on a screen;

an application processing section for executing a plurality of applications;

a virtual screen processing section for setting a virtual screen larger than is allowed by a display performance of a screen of the display section, displaying a part of the virtual screen as a real screen on the display section, and controlling a position of the real screen as needed in accordance with an operational input made by using the information input section;

a window processing section operable in association with the application processing section and the virtual screen processing section for arranging display screens based on execution of the applications as application windows on the virtual screen;

a list display instructing section for instructing a display of a list of application windows to be used by applications currently run by the application processing section, by an operational input made by using the information input section; and a list display processing section for collecting window information including application information indicative of running applications and position information of the application windows of the running applications on the virtual screen, application by application, and displaying a window information list based on the window information on the display section.

The list display processing section may provide position designation areas for individual running applications in the window information list to be displayed on the display section, and may include:

a position designator for producing position designation information designating positions of application windows associated with the individual running applications by using the position designation areas provided in the window information list to be displayed on the display section; and a window position control section for controlling the window processing section in accordance with the position designation information produced by the position designator to thereby control positions of application windows of running applications associated with the position designation information on the virtual screen.

The position designator may include a fixed position designator for selectively producing at least one piece of preset, fixed position information.

The position designator may include a free position designator for selectively producing free position information arbitrarily settable by the operator.

The position designator may include a fixed position designator for selectively producing at least one piece of preset, fixed position information;

a free position designator for selectively producing free position information arbitrarily settable by the operator; and a selector for selecting one of the fixed position designator and the free position designator.

The fixed position designator may include fixed position information on the real screen as preset fixed position information.

The fixed position designator may include position information of four corners of the real screen as preset fixed position information.

The fixed position designator may include position information of a center of the real screen as preset fixed position information.

The position designator may include a position input section for updating desired position information of an application window in an associated one of the position designation areas in the window information list to be displayed on the display section in accordance with an operational input made through the information input section, and producing updated position designation information.

The virtual screen display system may further comprise a set-condition display section for making a model of a relationship among the virtual screen, the real screen and the individual application windows based on the position designation information produced by the position designator, and displaying the model on the display section.

The virtual screen display system may further comprise a window information storage for storing window information for each application produced by the list display processing section, and an activation position control section for controlling the window position control section in accordance with the window information when, upon activation of an application, window information of the application is stored in the window information storage.

The list display instructing section may further include a task switcher for recognizing a selective application designating operation using the window information list to be displayed on the display section and making a designated task among tasks of running applications as an effective operation target. In this case, the list display instructing section may be set as a task manager in the window processing section.

The list display processing section may provide window-size designation areas for individual running applications in the window information list to be displayed on the display section, and may include:

a size designator for producing window-size designation information for designating window sizes of an application windows associated with individual running applications, by using the window-size designation areas provided in the window information list to be displayed on the display section; and a window-size control section for controlling the window processing section in accordance with the window-size designation information produced by the size designator to thereby control a window size of an application window of a running application, associated with the window-size designation information, on the virtual screen.

The size designator may produce window-size designation information indicating window sizes and shapes of application windows, and the window-size control section may control window sizes and shapes on the virtual screen in accordance with the window-size designation information.

The size designator may include a fixed size designator for selectively producing at least one piece of preset, fixed size information.

The fixed size designator may include fixed size information on the real screen as preset fixed size information.

The fixed size designator may include size information of at least one of a standard size, a minimum size and a maximum size on the real screen as preset fixed size information.

The size designator may include a free size designator for selectively producing free size information arbitrarily settable by the operator.

The size designator may include a size input section for updating desired display size information of an application window in an associated one of the window-size designation areas in the window information list to be displayed on the display section in accordance with an operational input made through the information input section, and producing updated display size designation information.

The virtual screen display system may further comprise a set-condition display section for making a model of a relationship among the virtual screen, the real screen and the individual application windows based on the designation information produced by the position designator and the size designator, and displaying the model on the display section.

The virtual screen display system may further comprise a window information storage for storing window information for each application produced by the list display processing section, and an activation position control section for controlling at least one of the window position control section and the window size control section in accordance with the window information when, upon activation of an application, window information of the application is stored in the window information storage.

The list display instructing section may further include a task switcher for recognizing a selective application designating operation using the window information list to be displayed on the display section and making a designated task among tasks of running applications as an effective operation target. In this case, the list display instructing section may be set as a task manager in the window processing section.

According to the virtual screen display system embodying this invention, when some application window exists on the virtual screen but completely off the real screen, an application interface (API), for example, in the window system is used to display a list including running applications and the position information, such as coordinates, of their application windows on the real screen so that an operator can see the application windows which are not currently displayed on the real screen and the positions of those application windows.

Even when a tool for setting and displaying the virtual screen is inactive and the positional coordinates of application windows on the display screen are unsettled, e.g., when those positional coordinates take negative values, this virtual screen display system can allow an operator to recognize the application windows and their positions.

Further, this virtual screen display system can allow an operator to designate the position or size of the application window of a desired application on the real screen and can execute display control according to the designation, so that at least one of the position and size of that application window can be altered.

BRIEF DESCRIPTION OF THE DRAWINGS

Other objects and advantages of the invention will become apparent during the following discussion in conjunction with the accompanying drawings, in which:

FIG. 7 is a diagram for explaining a list of window information in the system shown in FIG. 6.

DETAILED DESCRIPTION OF THE PREFERRED EMBODIMENTS

Virtual screen display systems according to preferred embodiments of the present invention will now be described with reference to the accompanying drawings.

FIRST EMBODIMENT

Figure 1:
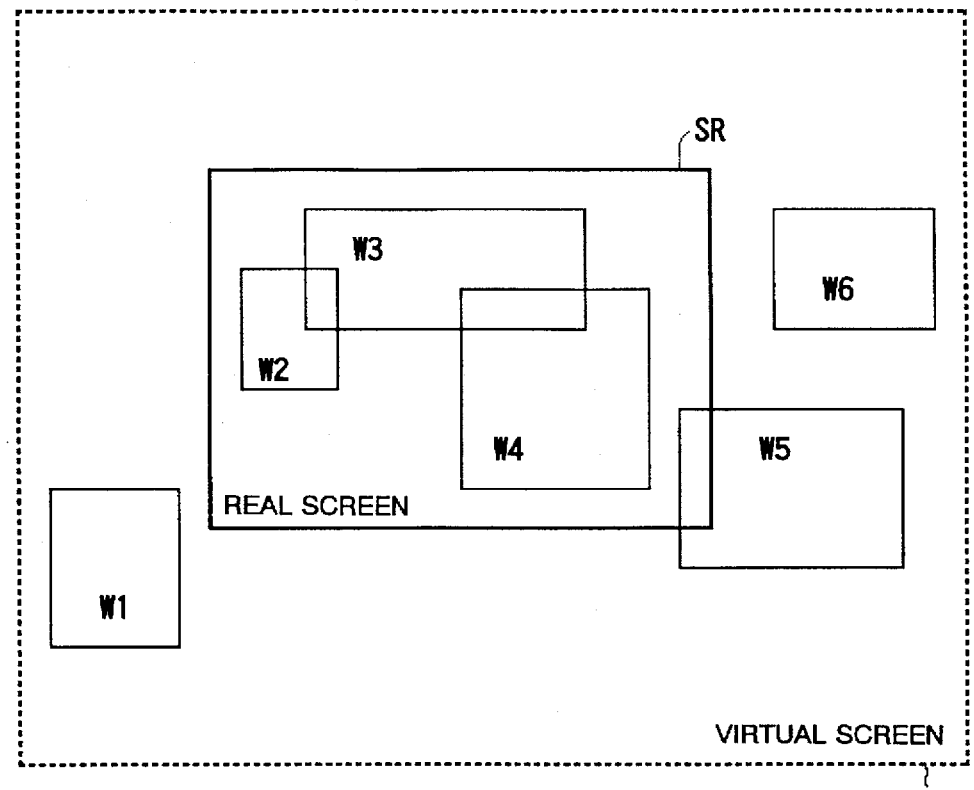
FIG. 1 is a diagram for explaining a conventional window system and a conventional virtual screen display system.
Figure 1:
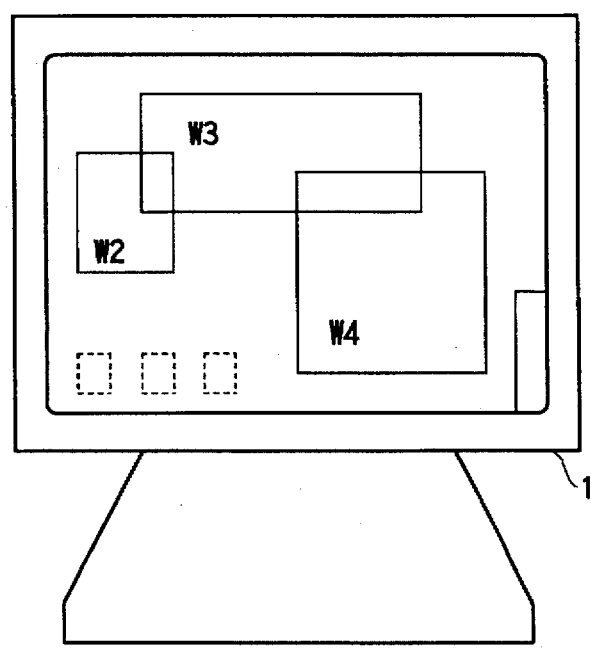
Figure 2:
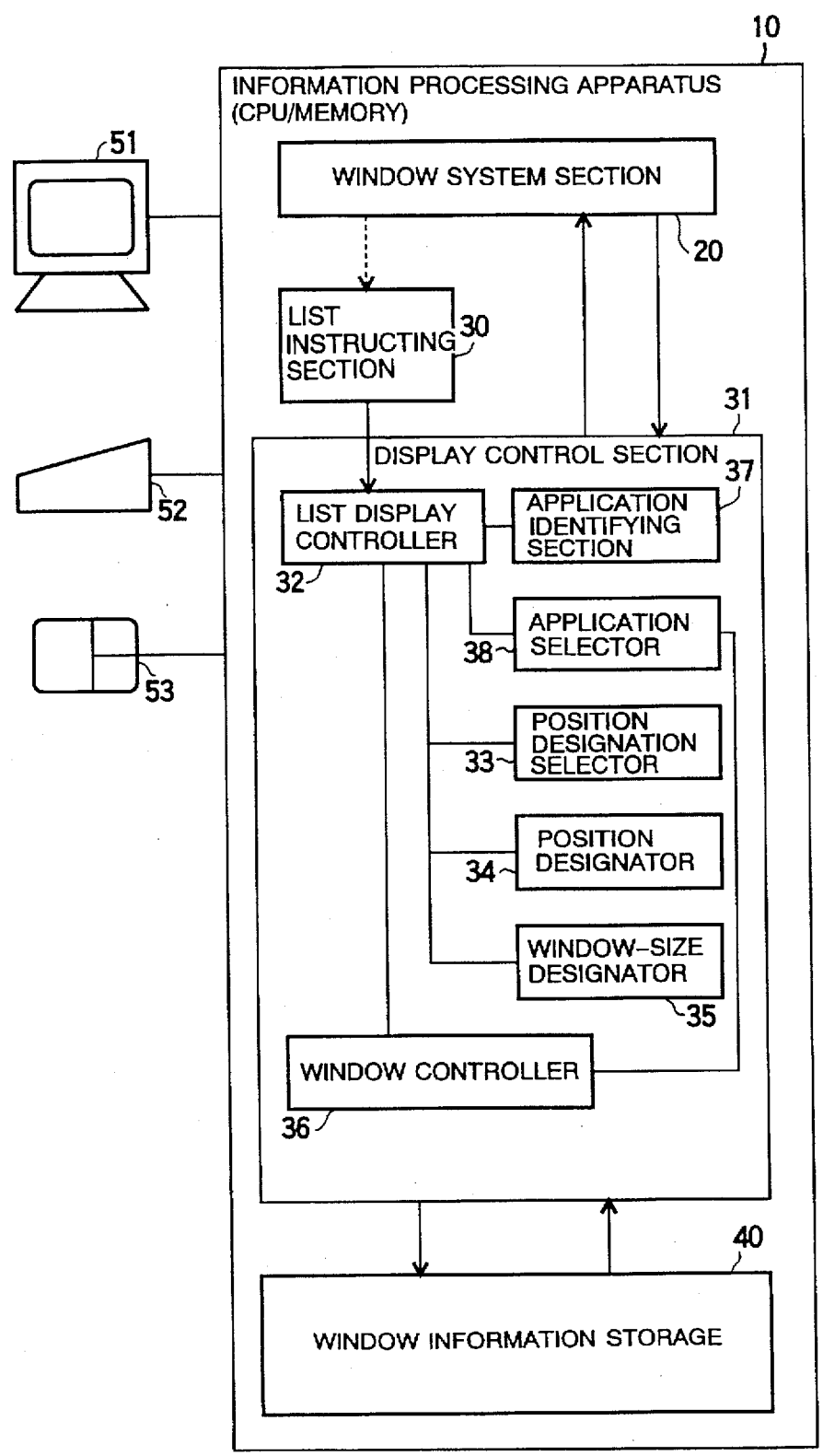
FIG. 2 is a block diagram showing the structure of a window system incorporating a virtual screen display system according to the first embodiment of the present invention.

FIG. 2 shows the structure of a window system which incorporates a virtual screen display system according to the first embodiment of this invention.

The system in FIG. 2 comprises an information processing apparatus 10, a display 51, a keyboard 52 and a mouse 53.

Like a personal computer, a word processor or a work station, for example, the information processing apparatus 10 includes a CPU (Central Processing Unit) and a memory, and accomplishes various kinds of functions mainly by software. The functions that are accomplished by the information processing apparatus 10 include functions which may be accomplished by hardware.

The display 51 uses a display device like a CRT or LCD device to display images such as windows on the screen or the real screen.

The keyboard 52 is used to input information into the system when manipulated by an operator. As the operator clicks a mouse button of the mouse 53 while observing a mouse cursor or mouse pointer displayed on the display 51, information corresponding to a position on the display screen is input to the system. In addition to the keyboard 52 and the mouse 53, another input device or pointing device may be provided. Parts or all of the keyboard 52 and mouse 53 may be replaced with another input device and/or another pointing device.

From at least the functional point of view, the information processing apparatus 10 includes a window system section 20, a list display instructing section 30, a display control section 31 and a window information storage 40.

The window system section 20 executes the system processing of a multiwindow system such as Windows or X-Window. This window system section 20 controls the execution of one or more applications on the multiwindow system and the display of application windows those applications use. Further, the window system section 20 can run an application tool for achieving the virtual screen display. As this application tool is executed by the window system section 20, the system process of the virtual screen display system which accomplishes a multiwindow system on the virtual screen is executed. Unless otherwise specified, the window system section 20 will be hereinafter explained on the premise that it is performing the system process as the virtual screen display system.

The list display instructing section 30 instructs the display control section 31 to display a list of window information including position and size information of application windows associated with applications which are currently running on the multiwindow system, based on an operational input made through the keyboard 52 or the mouse 53.

The window information storage 40 stores at least a part of window information which is used to display the list of the window information. The window information to be stored in this window information storage 40 may be referred to at the time of later invoking of an application, in which case the window information storage 40 is constructed in a non-volatile memory or a non-volatile storage device like a hard disk to save the window information in the form of a file. When the window information storage 40 is not itself constituted of a non-volatile storage device, a file of the window information should be transferred to and saved in a non-volatile memory or a non-volatile storage device like a hard disk.

In response to the instruction from the list display instructing section 30, the display control section 31 causes the display 51 to display a list of window information including the position and size information of application windows associated with applications currently running on the multiwindow system, and adjusts at least one of the position and size of each application window on the screen, for example, on the virtual screen. The position of each application window is information corresponding to the coordinates on the virtual screen.

The display control section 31 has a list display controller 32, a position designation selector 33, a position designator 34, a window-size designator 35, a window controller 36, an application identifying section 37 and an application selector 38.

In response to the instruction from the list display instructing section 30, the list display controller 32 performs such control as to prepare a list of window information including the position and size information of application windows, associated with applications currently running on the multiwindow system, via the application identifying section 37, store the list in the window information storage 40, and display the list of the window information on the display screen of the display 51 or the real screen. In this case, the list of the window information includes information on each currently running application, the position information of the application window associated with this application and the display size information of that application window.

The position designation selector 33 executes a process for selecting either fixed position selection or free position designation to designate the position of each application window to be displayed based on the operator's operation using the keyboard 52, the mouse 53 or the like. In this case, the fixed position selection means the designation of the position of an application window by the operator's selecting a desired fixed position from among a plurality of preset fixed positions including the center of the real screen, the upper left corner, the left center, the lower left corner, the upper right corner, the right center, the lower right corner, the top center and the bottom center. The free position designation means the direct designation of an arbitrary position by the operator. The position designation selector 33 provides areas in the list of the window information for displaying selection information of the position designating methods, and allows the operator to designate the desired area by manipulating the keyboard 52 or the mouse 53 to thereby select the method for designating the position of an application window as needed.

The position designator 34 executes a process for a specific position designating operation according to the position designating method selected by the position designation selector 33. More specifically, the position designator 34 performs a process for an operation of selecting one fixed position from the multiple fixed positions when the fixed position selection has been selected, and performs a process for an operation of allowing the operator to input position information as needed using the keyboard 52, the mouse 53 or the like when the free position designation has been selected. Further, the position designator 34 renews the information stored in the window information storage 40 based on the designated position information.

The window-size designator 35 executes a process of selecting one desired window size from a plurality of preset fixed sizes, such as the standard size, the minimum size, the maximum size and an icon, to designate the window size. This window-size designator 35 provides window size areas in the list of display information to be displayed on the display 51 to display window size information, and executes a process of allowing the operator to selectively designate the display content of the window size area associated with each application window by using the keyboard 52, the mouse 53 or the like. By giving coordinates information or the like to the window-size designator 35, the window size may be designated directly. Normally, windows are substantially rectangular, so that the shape of a window can be altered by changing the vertical to horizontal ratio of that window through the designation of the window size by means of the window-size designator 35. In this respect, the "window size" should include the concept of the shape of a window based on at least the vertical to horizontal ratio of the window.

When at least one of the position designation selector 33, the position designator 34 and the window-size designator 35 selects the method of designating a window position, designates a window position or designates a window size, respectively, the window controller 36 controls the window system section 20 to execute a process of changing the position or size of the window that is used by the associated running application.

When the display of the list of window information is instructed by the list display instructing section 30, the application identifying section 37 executes a process of identifying currently running applications and acquiring the information of those applications, e.g., the application names, by using system functions, macro functions or the like which are provided by the system that runs under the control of the window system section 20. In other words, the above-discussed list display controller 32 prepares a list of window information for currently running applications whose information or names are to be acquired by the application identifying section 37.

The application selector 38 discriminates the application the change of whose window position or window size has been designated by, for example, at least either the position designator 34 or the window-size designator 35, and provides information indicative of that application for the control that is executed by the window controller 36.

Figure 3:
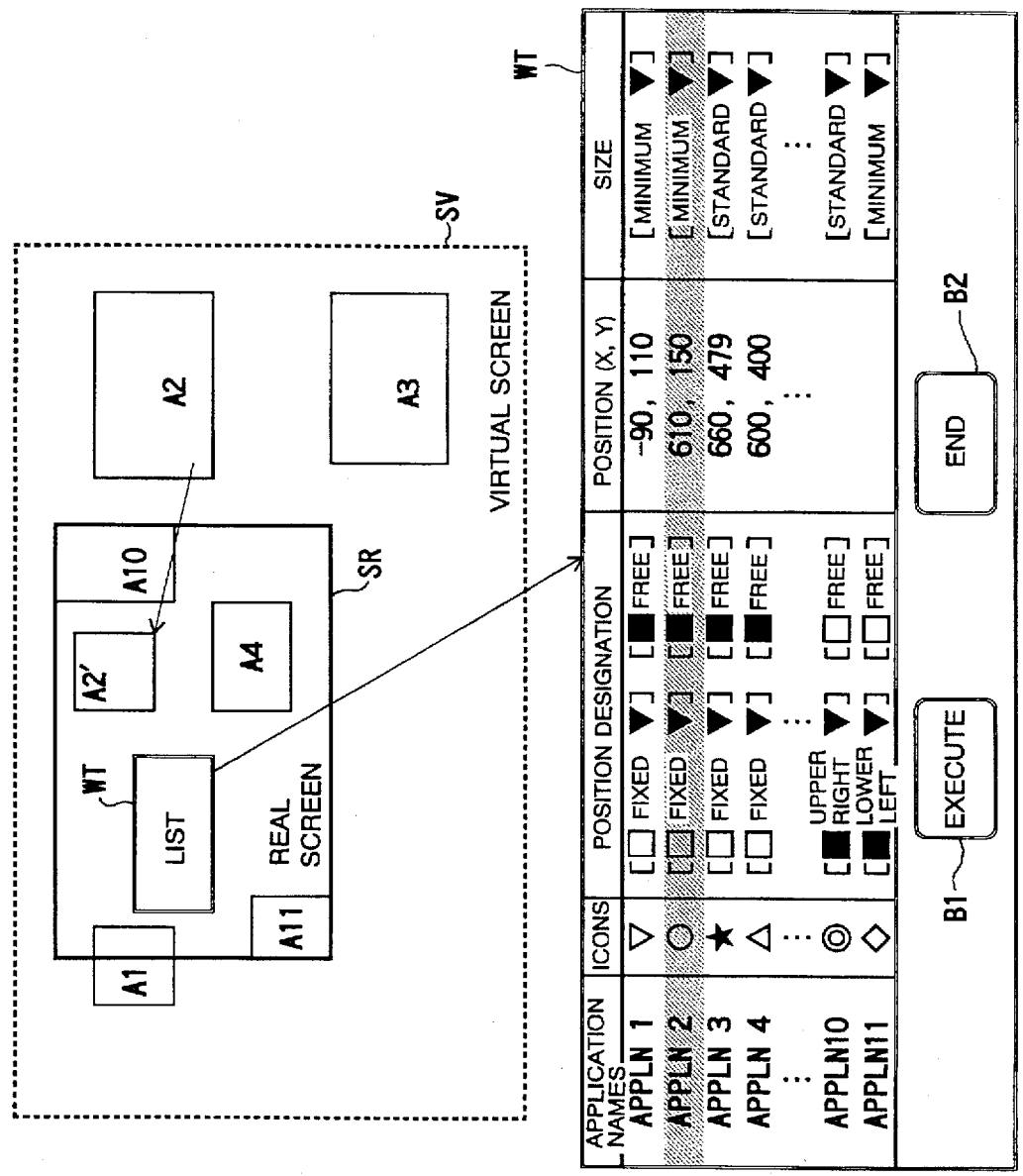
FIG. 3 is a diagram for explaining a list of window information in the system shown in FIG. 2.

Referring to FIG. 3, a specific example of the display of a list of window information will be discussed below.

FIG. 3 shows the relationship among the real screen, the virtual screen, a plurality of application windows and a list of window information, and shows a specific example of the display contents of the list of window information.

The virtual screen SV is set larger than the real screen SR which is actually displayed on the screen of the display 51, i.e., the virtual screen SV is so set as to have a wider range as an effective display area. A list of window information, WT, is always located within the real screen SR on the principle. Arranged in the virtual screen SV are a plurality of application windows A1, A2 (A2'), A3, A4, A10 and A11 which a plurality of currently running applications use.

The window information list WT has an EXECUTE button B1 and an END button B2 for selective instruction associated with the operation of altering a window position and a window size, in addition to a list of window information itself.

In the virtual screen SV shown in FIG. 3, the application windows A4, A10 and A11 are entirely positioned in the real screen SR, and are displayed on the screen of the display 51. No parts of the application windows A2 and A3 are located inside the real screen SR, while the application window A1 has only its right-hand part shown in the real screen SR in FIG. 3.

For an application window located on the virtual screen SV but outside the real screen SR, for example, the application window A2, an operator cannot completely know where the application window A2 is located, or may not even know the actual presence of the application window A2. When a large application window overlies and completely covers a smaller application window, the operator cannot also recognize the smaller application window.

In such a case, the display control section 31 is activated by the list display instructing section 30.

As one way of activating the display control section 31 by means of the list display instructing section 30, in the case of the aforementioned Windows, the operator manipulates the keyboard 52 or the mouse 53 from the file manager or the program manager to designate a program file or an icon equivalent to the list display instructing section 30. Of course, the display control section 31 can be activated by the same way as used to activate ordinary applications.

The display control section 31 identifies currently running applications and acquires the application names through the application identifying section 37, acquires the positions and sizes of the application windows of those applications through the application interface of the window system section 20, and displays the window information list WT as shown in FIG. 3 in the real screen SR on the display 51 by means of the list display controller 32.

The list WT includes fields for the application name, icon, position designation, the window position on the virtual screen SV and the window size for each currently running application.

Displayed in the application name field are application names such as "APPLN1," "APPLN2," . . . , and "APPLN11." The windows those applications "APPLN1," "APPLN2," . . . , and "APPLN11" use are assumed to the application windows A1, A2, . . . , and A11 on the virtual screen SV, respectively.

Displayed in the icon field are figures corresponding to the icons of the application windows A1 to A11.

Displayed in the position designation field are items or the like for the switching between the fixed position designation and the free position designation and the selection of a desired fixed position from among a plurality of preset fixed positions.

More specifically, as shown in FIG. 3, the items "FIXED" and "FREE" are displayed together with buttons or so-called radio buttons to specify their selection. In this case, the button for selecting "FIXED" or "FREE" is indicated by "■" which shows the selected state or "□" which shows the unselected state, and when one of the buttons is pointed and selected (pointing to one button and then clicking the mouse button), the selected state is inverted.

When "FIXED" is selected, the display item on the fixed side is changed to one of the items indicative of the preset fixed positions, such as "UPPER RIGHT CORNER" or "LOWER LEFT CORNER," and a button "▼" for selecting the fixed position becomes enabled. The button "▼" may be displayed previously (with the function disabled) even if "FIXED" has not been selected as shown in FIG. 3, or may be displayed only when "FIXED" is selected. When the button "▼" is pointed and selected, a list of a plurality of preset fixed positions is pulled down so that when the operator specifies one fixed position, it is selected. As the listed fixed positions, some or all of the typical positions, such as "screen center," "upper left corner," "left center," "lower left corner," "upper right corner," "right center," "lower right corner," "top center" and "bottom center," with respect to the real screen SR should be prepared.

When "SCREEN CENTER" is selected, the application window of the target application is displayed at the center of the real screen SR. When "UPPER RIGHT CORNER" is selected, the target application window is shifted, as needed, to the upper right corner of the real screen SR, like the application window A10 in FIG. 3. Likewise, when "LOWER LEFT RIGHT CORNER" is selected, the target application window is shifted to the lower left corner of the real screen SR, like the application window A11 in FIG. 3.

When "FREE" is selected in the aforementioned position designation field, the manipulation of the next field or the position field becomes enabled.

When "FREE" is selected, the operation mode becomes the free position designation mode so that the coordinates are input in the position field, the display position of the associated application window is set. That is, the application window whose coordinates are designated in the free position designation mode is set at the position corresponding to the specified coordinates information.

The coordinates (X, Y) indicating a position are expressed by the relative coordinates of the horizontal pixel position X which is positive on the right-hand side of the upper left corner of the real screen SR taken as the origin to the vertical pixel position Y which is positive below the origin. The coordinate values in this coordinate system can be input and set as desired by the operator. The coordinates information may be input by directly inputting numerals through the keyboard 52 or by continuously changing the coordinate value using buttons displayed on the screen to indicate the increase or decrease for each coordinate. The positions of application windows may be determined by the absolute coordinates with the upper left corner of the virtual screen SV taken as the origin.

The size field shows information on set sizes, and the size of a window to be actually displayed is set by changing the display contents of the size field. As in the case of the position designation, the window size may be selected from a plurality of fixed sizes or may be freely designated by inputting arbitrary size information.

Normally, the size of an application window when displayed on the real screen SR can be arbitrarily changed by dragging the window with the mouse, so that it is sufficient to designate the desired one from a plurality of fixed sizes. For example, a plurality of fixed window sizes should be set previously, so that the operator could designate the desired window size by selectively specifying that window size from the fixed window sizes.

This will be discussed below more specifically. The display item is changed to one of the preset fixed sizes, such as "MAXIMUM SIZE" or "MINIMUM SIZE," and the button "▼" for selecting the size becomes enabled. When this button "▼" is pointed and selected, a list of a plurality of preset sizes is pulled down so that when the operator specifies one size in the list, it is selected. As the listed sizes, some or all of the typical window sizes, such as "icon," "standard size" "minimum size" and "maximum size," should be prepared.

Through this window information list WT, the operator can easily check the statuses of the windows of currently running applications. The operator can easily find the desired application window from this list WT.

The EXECUTE button B1 and END button B2 are provided at the bottom of the window information list WT as shown in FIG. 3. When the EXECUTE button B1 is pointed and selected, the alteration of a window is executed based on the window alteration operation. When the END button B2 is pointed and selected, the display of the list WT is terminated.

To display the desired application window, for example, the application window A2, in the "minimum size" on the real screen SR, the operator should find "APPLN2" from the application name field in the list WT first, and then clicks the item with the mouse 53 to select the application "APPLN2." Alternatively, the operator should manipulate the cursor shift keys (arrow keys) on the keyboard 52 to shift the cursor on the real screen SR and press the ENTER key (which may also be called the RETURN key) at the associated position to select "APPLN2." When the application is selected in this manner, the line associated with the selected application "APPLN2" is reversed, is highlighted or is displayed with a different color from the color of the other part, indicating that the application has been selected. The application selector 38 in FIG. 2 recognizes the selected application based on the information of the cursor position then.

Then, the operator selects "FREE," for example, in the position designation field via the position designation selector 33, and inputs the coordinates (610, 150), indicating where to display the target application window, in the position field via the position designator 34. The operator selects the "minimum size" in the size field using the window-size designator 35.

When the EXECUTE button B1 is clicked after such an operation, the window controller 36 responds to the clicking action, and settles the window information set in the list WT and stores the window information in the window information storage 40. The application "APPLN2" which has been displayed in the application window A2 is displayed in an application window A2' shown in FIG. 3 at the new set position and with the new size on the real screen SR.

The positions or display sizes of the other application windows can also be altered in the same manner as has been explained above.

When the END button B2 is clicked with the mouse 53, the display control section 31 terminates the process of displaying the list WT to erase the list WT from the real screen SR. At this time, the information in the window information storage 40 is saved as a file in a non-volatile memory or a non-volatile storage device like a hard disk, so that the information will be referred to display a window when an application is activated next and to define the location or size of the associated application window upon activation of the storage 40 itself may be constituted by a non-volatile application. In this case, the window information memory or a non-volatile storage device like a hard disk, or if otherwise, the file of the window information should be transferred to and saved in a non-volatile storage device. In the case where the thus saved window information corresponding to the list WT defines the location or size of an application window when each application is activated next, if the saved file of the window information is editable, it is possible to set the location or size of an application window, as desired, when the associated application is activated.

When the tool that provides the virtual screen SV is not running or the tool is forcibly terminated during execution for some reason, if the coordinates of an application window are unsettled (due to negative coordinate values, for example), the associated application is not displayed on the real screen SR. The operator cannot therefore find this application window. Even in this case, it is still possible to change the position or size of this application window by displaying the window information in the list WT and executing the same operation as has been discussed above.

Figure 4:
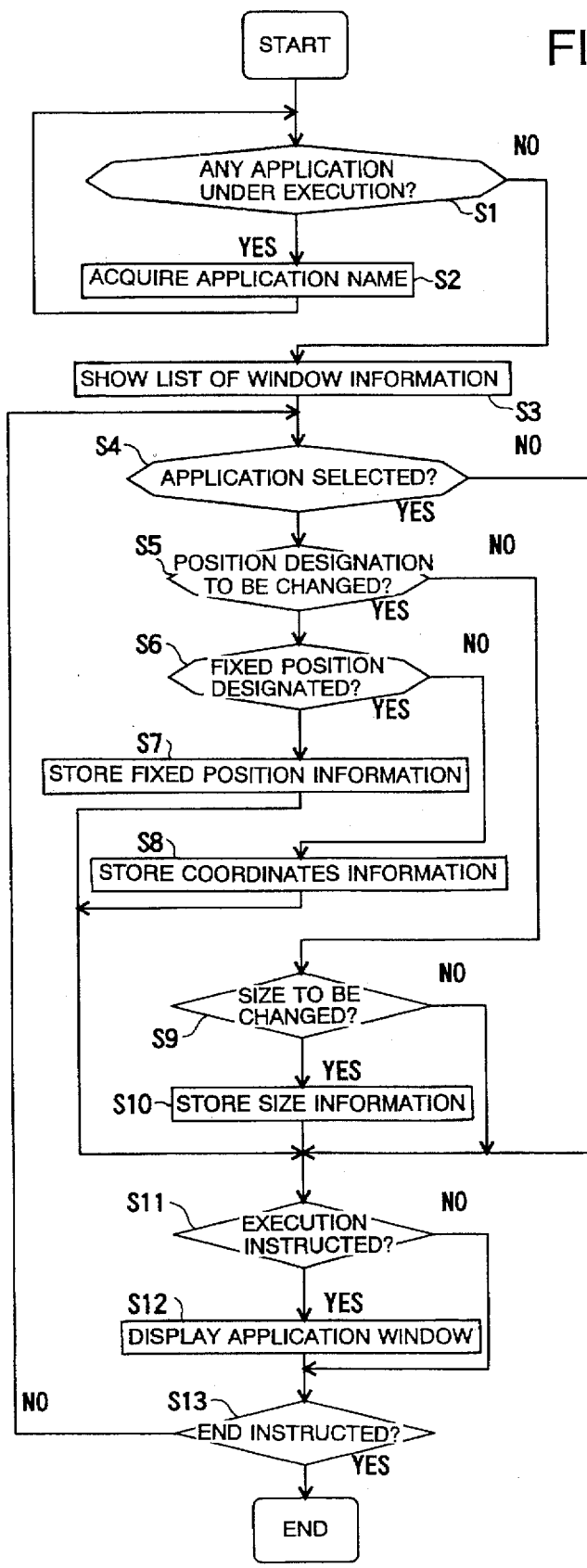
FIG. 4 is a flowchart for explaining the operation of the system in FIG. 2.

FIG. 4 shows a flowchart for the above-described process. The process illustrated in FIG. 4 starts when the list display instructing section 30 instructs the display of the window information list.

When this process starts, it is determined first if there is any unidentified and currently running application (step S1), and the application names of currently running applications are acquired one by one until no currently running application is left (step S2).

When the application names of all the currently running applications are acquired, the window information list WT as shown in FIG. 3 is prepared and displayed on the display 51 (step S3). At this time, window information such as the positions and sizes of the application windows of the currently running applications are acquired using the application interface in the window system section 20. If the window system to be constructed by the window system section 20 is Windows, the application interface like the GetWindowRect function can be used to obtain the positions and sizes of the application windows.

With the window information list WT shown on the display 51, it is determined if an application in the list WT has been selected (step S4). That is, it is determined in step S4 if an item, such as an application name or an icon, in the list WT has been clicked with the mouse 53 or if the ENTER key on the keyboard 52 has been depressed.

When it is determined in step S4 that an application has been selected, it is determined if there is any change in the window position designation (step S5). When it is determined in step S5 that the position designation has been changed, it is then determined if the new position designation is "FIXED" or "FREE" (step S6). When it is determined as "FIXED" in step S6, the coordinates information corresponding to the selected fixed position like the upper right corner or the lower left corner is stored in the memory (work area or the window information storage 40) (step S7). In saving window information as a file in a non-volatile storage device, it is desirable that the updating and saving of the file of window information should be performed at this point of time. When it is determined as "FREE" in step S6, the coordinate value designated as the position (X, Y) is stored in the memory (step S8).

When it is determined in step S5 that there is no alteration of the position designation, it is determined if size alteration is specified (step S9). When size alteration is specified, the designated display size (e.g., the minimum size, standard size or maximum size) is stored in the memory (step S10).

When it is determined in step S4 that no application has been selected, when it is determined that no size alteration has been specified in step S9 after the coordinates information of the fixed position is stored in step S7 or after the coordinates information of the free position in step S8, and after the size is stored in step S10, it is determined if "execution" has been specified by clicking of the EXECUTE button B1 or the depression of the ENTER key (step S11).

When the instruction of the "execution" is determined in step S11, the information saved in the window information storage 40 is updated and the application window of the selected application is displayed at the new position with the new size (step S12). If the window system section 20 is Windows, for example, the application window of the selected application can be displayed at the designated position with the designated size by using the application interface such as the MoveWindow function or SetWindowPos function.

When the application window is displayed at the designated position with the designated size in step S12, it is determined if the END button B2 has been clicked (step S13). When the END button B2 has been clicked, the process is terminated. When it is not determined in step S13 that the END button B2 has been clicked, the flow returns to step S4 and the same process is repeated until the END button B2 is clicked.

Even when it is not determined in step S11 that the "execution" has been designated, the flow proceeds to step S13 where it is determined if the END button B2 has been clicked.

As the operator instructs the display of the window information list as needed in the above-described manner via the list display instructing section 30, the list display controller 32 prepares the list WT of the window information including the position information of the application windows, used by currently running applications, on the virtual screen SV and displays the list on the real screen SR on the display 51. The operator can therefore directly comprehend where on the virtual screen SV the application window of each application is located, so the operator need not perform a troublesome operation of searching for any application which is off the real screen SR on the display 51.

Further, the position designation method, either the way of selecting the desired position from a plurality of fixed positions on the real screen SR or the way of inputting the position coordinates of a free position on the virtual screen SV by means of the position designator 34, is selected by the position designation selector 33, so that the position of the application window used by the desired application can easily be altered by the window controller 36. It is thus possible to easily shift an application window, which is not visible on the real screen SR, to the desired position.

The window size of an application window which is not positioned on the real screen SR can be changed to one of the standard size, the maximum size, the minimum size and the icon size, by designating the alteration of the window size of the target application window in the size field in the window information list WT, shown on the display 51, by means of the window-size designator 35. In this case, as in the case of the position designation, the window size may be altered by directly inputting the information on the vertical and horizontal coordinates or the information on the vertical and horizontal dot numbers, which determines the window size, in the list WT.

If window information equivalent to the list WT is saved as a file, when the execution of an application is terminated and this application is activated next, window information can be acquired from saved file of window information and this application can be activated in the application window whose position and size accord to the window information. Further, the position or size of an application window can be changed by editing the contents of the window information file.

SECOND EMBODIMENT

The above-described window system in FIG. 2 is designed to change the position and size (shape) of currently running applications using the window information list WT displayed on the real screen on the display 51. If the window information list WT is designed to permit the selection of a process task or a process application, a process task as well as the position or the size of an application window can be selected using the list WT. The second embodiment of this invention is designed to accomplish this function.

Figure 5:
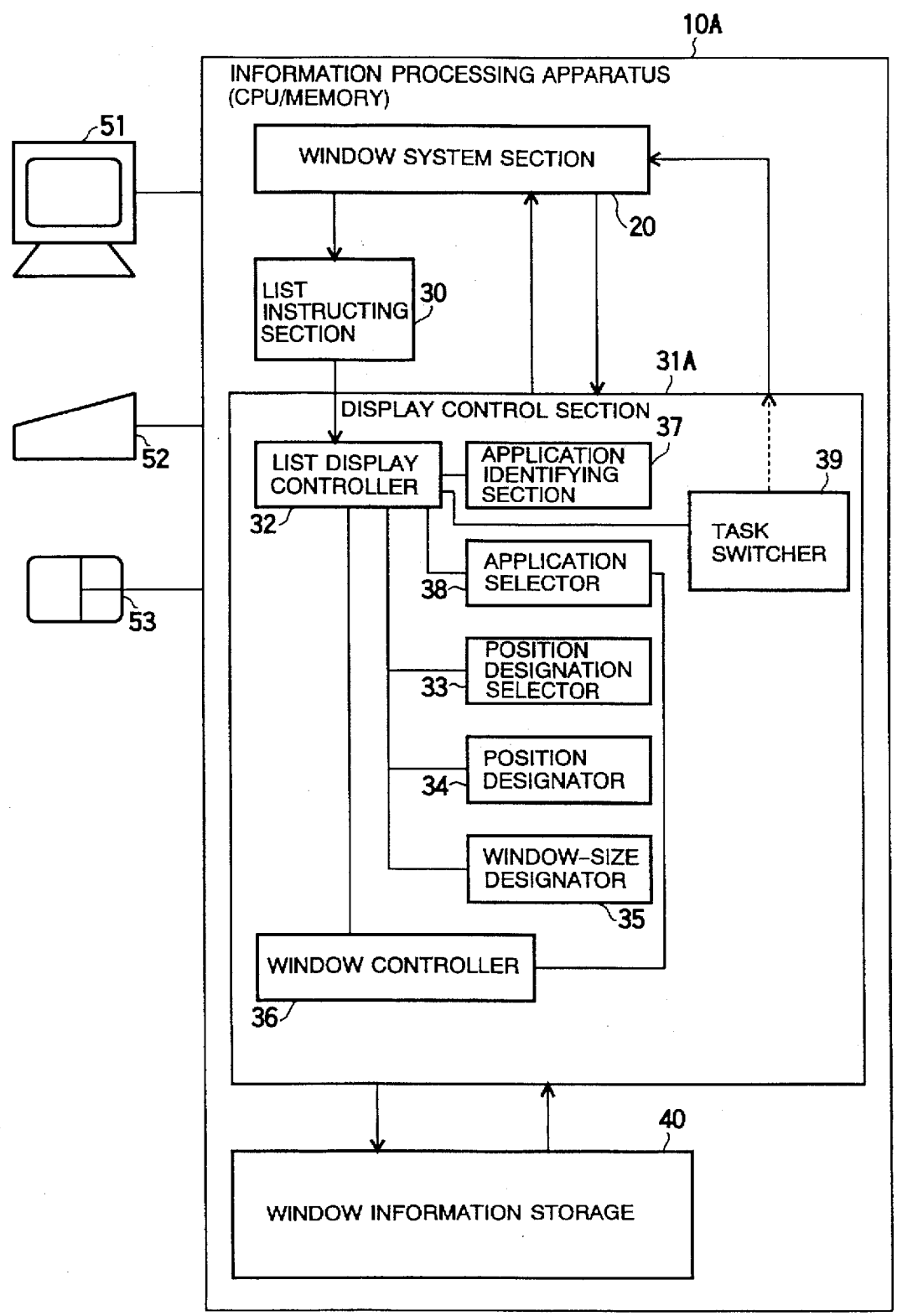
FIG. 5 is a block diagram showing the structure of a window system incorporating a virtual screen display system according to the second embodiment of the present invention.

FIG. 5 shows the structure of a window system incorporating a virtual screen display system according to the second embodiment. To avoid the redundant detailed description, like or same reference numerals are given to those components in FIG. 5 which are the same as the corresponding components in FIG. 2.

The system in FIG. 5, like the one in FIG. 2, comprises the display 51, the keyboard 52, the mouse 53, and an information processing apparatus 10A in place of the information processing apparatus 10 in FIG. 2. The information processing apparatus 10A in FIG. 5 differs from the information processing apparatus 10 in FIG. 2 in that a task switcher 39 is incorporated in a display control section 31A.

Like a personal computer, a word processor or a work station, for example, the information processing apparatus 10A includes a CPU and a memory, and accomplishes various kinds of functions mainly by software. The functions that are accomplished by the information processing apparatus 10A include functions which may be accomplished by hardware.

In addition to the keyboard 52 and the mouse 53, another input device or pointing device may be provided. Parts or all of the keyboard 52 and mouse 53 may be replaced with another input device and/or another pointing device.

From at least the functional point of view, the information processing apparatus 10A includes the window system section 20, the list display instructing section 30, and the window information storage 40 like those in FIG. 2, and further has the display control section 31A in place of the display control section 31 in FIG. 2.

The list display instructing section 30 instructs the display control section 31A to display a list of window information including position and size information of application windows associated with applications which are currently running on the multiwindow system, based on an operational input made through the keyboard 52 or the mouse 53.

In response to the instruction from the list display instructing section 30, the display control section 31A causes the display 51 to display a list of window information including the position and size information of application windows associated with applications currently running on the multiwindow system, and adjusts at least one of the position and size of each application window on the screen, for example, on the virtual screen SV. Further, the display control section 31A controls the selection of a task (application) to be enabled as the operational target from currently running applications or tasks through an operation of selective designation on the displayed list WT.

The display control section 31A has the aforementioned task switcher 39 in addition to the list display controller 32, the position designation selector 33, the position designator 34, the window-size designator 35, the window controller 36, the application identifying section 37 and the application selector 38 like those in FIG. 2.

The task switcher 39 identifies an operation of designating one of applications on the displayed list WT via the list display controller 32 and controls the window system section 20 to enable an operation on this application in order to selectively enable the task of the designated application. More specifically, when the operator double-clicks the application name of the desired application whose task is desired in the list WT or double-clicks the icon field with the mouse 53, the task of the application corresponding to the application name or the icon is enabled. As a result, the window system section 20 displays the application window of that application by priority (i.e., at the topmost position), and executes a process associated with task selection to reflect the manipulation of the keyboard 52 and the mouse 53 on this application.

As one way of activating the display control section 31A by means of the list display instructing section 30, in the case of the aforementioned Windows as already discussed earlier, the operator manipulates the keyboard 52 or the mouse 53 from the file manager or the program manager to designate a program file or an icon equivalent to the list display instructing section 30.

In this case, since the task switcher 39 can execute the process task selection from the window information list WT, the display control section 31A can select a process task from the list WT as well as can change the position or size of the associated application window. For example, double-clicking the desired application name or icon in the list WT with the mouse 53 can immediately terminate the display of the window information list WT to proceed to the processing by this application. In this case, the display control section 31A also serves as the task manager or task switcher.

In this case, the list display instructing section 30 may be activated not only based on the ordinary operation through the keyboard 5 or the mouse 53, but also by an activation method specific to the task manager.

In the aforementioned Windows, as well known, the program file (equivalent to the list display instructing section 30) can be registered as a task manager in place of the task manager (e.g., TASKMAN.EXE) which comes equipped with Windows by making a predetermined description in the system initial file called "SYSTEM.INI." Once such registration of a task manager is accomplished, the display control section 31A can be activated instead of the standard Windows' task manager by performing a predetermined operation to activate the task manager by double-clicking the left button of the mouse 53 on the desk top on Windows where nothing is displayed.

As the operator designates the display of a list as needed in the above-discussed manner, the list display controller 32 prepares the list WT of window information including the position information of the application windows to be used by currently running applications on the virtual screen SV, and displays the list WT on the real screen SR on the display 51. Therefore, the operator can directly grasp where on the virtual screen SV the application window of each application is located, and need not perform a troublesome operation of searching for any application which is positioned outside the real screen SR on the display 51.

By executing the position designation via the position designation selector 33 and the position designator 34, it is possible to change the position of the application window of the desired application via the window controller 36. Therefore, any application window which is not visible on the real screen SR can easily be shifted to the desired position on the real screen SR, for example. Further, the size of a window can easily be changed by designating the alteration of the window size by means of the window-size designator 35.

In this case, because the display control section 31A serves as the task manager, the display control section 31A can select a process task from the list WT as well as can change the position or size of the application window. For instance, it is possible to proceed to the processing by the desired application by double-clicking the desired application name or icon in the list WT with the mouse 53 during the execution of the task of one application.

The operator can easily check the currently running applications and their window statuses from the displayed window information list WT, can change the position or the display size of the window of any currently running application, and can select the desired task from the displayed applications to immediately proceed to the process of the desired task.

THIRD EMBODIMENT

The above-described window system in FIG. 5 is designed to change the position and size (shape) of currently running applications and to select a process task using the window information list WT displayed on the real screen on the display 51. This operation becomes simpler if an image of window information including a window figure which graphically shows the positional or coordinate relationship among the real screen SR, the virtual screen SV and the individual application windows is displayed together with the list WT on the real screen SR to allow the alteration of the window position or size or the selection of a process task to be accomplished by a graphical manipulation on the screen. The third embodiment of this invention is designed to achieve this feature.

Figure 6:
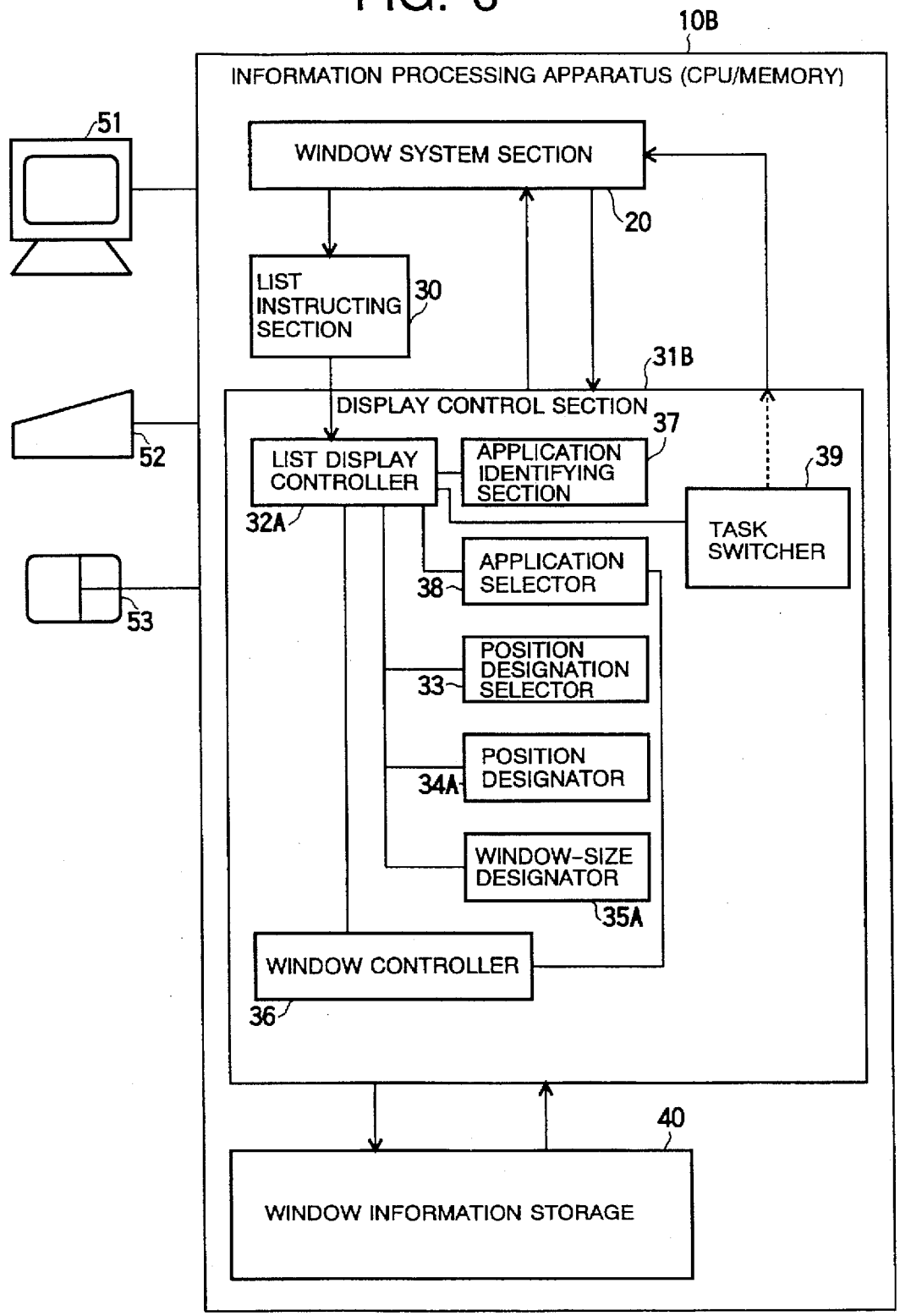
FIG. 6 is a block diagram showing the structure of a window system incorporating a virtual screen display system according to the third embodiment of the present invention.

FIG. 6 shows the structure of a window system incorporating a virtual screen display system according to the third embodiment. To avoid the redundant detailed description, like or same reference numerals are given to those components in FIG. 6 which are the same as the corresponding components in FIG. 5.

The system in FIG. 6, like the one in FIG. 5, comprises the display 51, the keyboard 52, the mouse 53, and an information processing apparatus 10B in place of the information processing apparatus 10A in FIG. 5. The information processing apparatus 10B in FIG. 6 differs from the information processing apparatus 10A in FIG. 5 in that a list display controller 32A, a position designator 34A and a window-size designator 35A are provided in the display control section 31B in place of the list display controller 32, position designator 34 and window-size designator 35.

Like a personal computer, a word processor or a work station, for example, the information processing apparatus 10B includes a CPU and a memory, and accomplishes various kinds of functions mainly by software. The functions that are accomplished by the information processing apparatus 10B include functions which may be accomplished by hardware.

In addition to the keyboard 52 and the mouse 53, another input device or pointing device may be provided. Parts or all of the keyboard 52 and mouse 53 may be replaced with another input device and/or another pointing device.

From at least the functional point of view, the information processing apparatus 10B includes the window system section 20, the list display instructing section 30, and the window information storage 40 like those in FIG. 5, and further has the display control section 31B in place of the display control section 31A in FIG. 5.

The list display instructing section 30 instructs the display control section 31B to display a list of window information including position and size information of application windows associated with applications which are currently running on the multiwindow system, based on an operational input made through the keyboard 52 or the mouse 53.

In response to the instruction from the list display instructing section 30, the display control section 31B causes the display 51 to display an image WI of window information including the position and size information of application windows associated with applications currently running on the multiwindow system, and adjusts at least one of the position and size of each application window on the screen, for example, on the virtual screen SV through a designation operation on the displayed window information image WI. Further, the display control section 31B controls the selection of a task (application) to be enabled as the operational target from currently running applications or tasks through an operation of selective designation on the displayed window information image WI.

The display control section 31B has the position designation selector 33, the window controller 36, the application identifying section 37, the application selector 38 and the task switcher 39 like those in FIG. 5, and further has the aforementioned list display controller 32A, position designator 34A and window-size designator 35A in place of the list display controller 32, position designator 34 and window-size designator 35.

The main feature of the display control section 31B in FIG. 6 lies in that the list display controller 32A displays not only the window information list WT shown in FIG. 3 but also the image WI of window information including a window figure WD which graphically shows the positional or coordinate relationship among the real screen SR, the virtual screen SV and the individual application windows, on the real screen SR as shown in FIG. 7.

The window information image WI displayed by the display control section 31B includes the window information list WT and the window figure WD as shown in FIG. 7. The window information list WT is the same as the one shown in FIG. 3. The window figure WD graphically shows the positional or coordinate relationship among the real screen SR, the virtual screen SV and the individual application windows A1 to A4, A10 and A11.

In this case, the position designator 34A is capable of producing and updating position information by a graphical manipulation on the window figure WD in addition to the functions of the position designator 34 in FIG. 2. The window-size designator 35A is capable of designating a window size by a graphical manipulation on the window figure WD in addition to the functions of the window-size designator 35 in FIG. 2.

In this case, the positions and sizes of the application windows A1–A4, A10 and A11 can be designated by manipulating the figures of those application windows A1–A4, A10 and A11 shown in the window figure WD using the mouse 53. In moving an arbitrary application window, for example, the mouse pointer should be positioned inside the figure of the desired application window on the window figure WD and is dragged with the mouse 53, in substantially the same way as done for the ordinary window moving operation on the screen of the display 51. To change the size of an application window, likewise, the mouse pointer should be positioned at each side or each corner of the figure of the desired application window on the window figure WD and is dragged with the mouse 53, in substantially the same way as done for the ordinary window size altering operation on the screen of the display 51.

As described above, as the operator instructs the display of a list, the list display controller 32A displays the list WT of window information including the position information of application windows to be used by currently running applications on the virtual screen SV and also the image WI of window information including a window figure WD which graphically shows the positional or coordinate relationship among the real screen SR, the virtual screen SV and the individual application windows, on the real screen SR or the screen of the display 51.

Therefore, the image WI can allow the operator to observe on the display screen where on the virtual screen SV the application windows of the individual applications are located, thus eliminating the need for a troublesome operation of searching for application windows which are out of the real screen SR shown on the display 51.

The operator can change the position or size of the application window associated with the desired application not only by a manipulation on the list WT but also by a manipulation on the window figure WD. It is therefore possible to easily move the application windows off the real screen SR to the desired positions in the real screen SR or easily change the window sizes.

Further, if the tool which provides the virtual screen display is controlled by a manipulation on the window figure WD, the position or size of the real screen SR with respect to the virtual screen SV can easily be changed as done for the alteration of the position or size of any application window.

It is apparent that, in this invention, a wide range of different working modes can be formed based on the invention without deviating from the spirit and scope of the invention.

What is claimed is:

1. A virtual screen display system comprising:

input means for inputting information;

display means for displaying images on a screen;

application processing means for executing a plurality of applications;

virtual screen processing means for setting a virtual screen larger than an actual screen of said display means, displaying a part of said virtual screen as a real screen on said display means, and controlling a position of said real screen as needed in accordance with an operational input made by using said input means;

window processing means operable in association with said application processing means and said virtual screen processing means for arranging display screens based on execution of said applications as application windows on said virtual screen;

list display instructing means for instructing a display of a list of application windows to be used by applications currently run by said application processing means, by an operational input made by said input means; and list display processing means for collecting window information including application information indicative of running applications and position information of said application windows of said running applications on said virtual screen, application by application, and displaying a window information list based on said window information on said display means.

2. A system according to claim 1, wherein said list display processing means provides position designation areas for individual running applications in said window information list to be displayed on said display means, and includes:

position designating means for producing position designation information designating positions of application windows associated with said individual running applications by using said position designation areas provided in said window information list to be displayed on said display means; and window position control means for controlling said window processing means in accordance with said position designation information produced by said position designating means to thereby control positions of application windows of running applications associated with said position designation information on said virtual screen.

3. A system according to claim 2, wherein said position designating means includes fixed position designating means for selectively producing at least one piece of preset, fixed position information.

4. A system according to claim 2, wherein said position designating means includes free position designating means for selectively producing free position information arbitrarily settable by said operator.

5. A system according to claim 2, wherein said position designating means includes:

fixed position designating means for selectively producing at least one piece of preset, fixed position information;

free position designating means for selectively producing free position information arbitrarily settable by said operator; and selecting means for selecting one of said fixed position designating means and said free position designating means.

6. A system according to claim 3, wherein said fixed position designating means includes fixed position information on said real screen as preset fixed position information.

7. A system according to claim 6, wherein said fixed position designating means includes position information of four corners of said real screen as preset fixed position information.

8. A system according to claim 6, wherein said fixed position designating means includes position information of a center of said real screen as preset fixed position information.

9. A system according to claim 2, wherein said position designating means includes position input means for updating desired position information of an application window in an associated one of said position designation areas in said window information list to be displayed on said display means in accordance with an operational input made through said input means, and producing updated position designation information.

10. A system according to claim 2, further comprising set-condition display means for making a model of a relationship among said virtual screen, said real screen and said individual application windows based on said position designation information produced by said position designating means, and displaying said model on said display means.

11. A system according to claim 2, further comprising window information storage means for storing window information for each application produced by said list display processing means, and an activation position control means for controlling said window position control means in accordance with said window information when, upon activation of an application, window information of said application is stored in said window information storage means.

12. A system according to claim 2, wherein said list display instructing means further includes task switching means for recognizing a selective application designating operation using said window information list to be displayed on said display means and making a designated task among tasks of running applications as an effective operation target.

13. A system according to claim 12, wherein said list display instructing means is set as a task manager in said window processing means.

14. A system according to claim 2, wherein said list display processing means provides window-size designation areas for individual running applications in said window information list to be displayed on said display means, and further includes:

size designating means for producing window-size designation information for designating window sizes of an application windows associated with individual running applications, by using said window-size designation areas provided in said window information list to be displayed on said display means; and window-size control means for controlling said window processing means in accordance with said window-size designation information produced by said size designating means to thereby control a window size of an application window of a running application, associated with said window-size designation information, on said virtual screen.

15. A system according to claim 14, wherein said size designating means produces window-size designation information indicating window sizes and shapes of application windows, and said window-size control means controls window sizes and shapes on said virtual screen in accordance with said window-size designation information.

16. A system according to claim 14, wherein said size designating means includes fixed size designating means for selectively producing at least one piece of preset, fixed size information.

17. A system according to claim 14, wherein said fixed size designating means includes fixed size information on said real screen as preset fixed size information.

18. A system according to claim 17, wherein said fixed size designating means includes size information of at least one of a standard size, a minimum size and a maximum size on said real screen as preset fixed size information.

19. A system according to claim 14, wherein said size designating means includes free size designating means for selectively producing free size information arbitrarily settable by said operator.

20. A system according to claim 14, wherein said size designating means includes size input means for updating desired display size information of an application window in an associated one of said window-size designation areas in said window information list to be displayed on said display means in accordance with an operational input made through said input means, and producing updated display size designation information.

21. A system according to claim 14, further comprising set-condition display means for making a model of a relationship among said virtual screen, said real screen and said individual application windows based on said designation information produced by said position designating means and said size designating means, and displaying said model on said display means.

22. A system according to claim 14, further comprising window information storage means for storing window information for each application produced by said list display processing means, and activation position control means for controlling at least one of said window position control means and said window size control means in accordance with said window information when, upon activation of an application, window information of said application is stored in said window information storage means.

23. A system according to claim 14, wherein said list display instructing means further includes task switching means for recognizing a selective application designating operation using said window information list to be displayed on said display means and making a designated task among tasks of running applications as an effective operation target.

24. A system according to claim 23, wherein said list display instructing means is set as a task manager in said window processing means.

* * * * *